(12) United States Patent
Saito et al.

(10) Patent No.: US 7,296,988 B2
(45) Date of Patent: Nov. 20, 2007

(54) MOLDING INFORMATION PRINTING SYSTEM

(75) Inventors: Osamu Saito, Yamanashi (JP); Kenji Araki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 387 days.

(21) Appl. No.: 10/790,117

(22) Filed: Mar. 2, 2004

(65) Prior Publication Data

US 2004/0221000 A1 Nov. 4, 2004

(30) Foreign Application Priority Data

Mar. 3, 2003 (JP) ............................. 2003-056266

(51) Int. Cl.
*B29C 45/17* (2006.01)
(52) U.S. Cl. ..................................... 425/169
(58) Field of Classification Search ................ 425/169; 709/201
See application file for complete search history.

(56) References Cited

U.S. PATENT DOCUMENTS

| | | | |
|---|---|---|---|
| 4,251,858 A | | 2/1981 | Cambigue et al. |
| 5,062,784 A | * | 11/1991 | Inaba et al. .................. 425/143 |
| 5,301,120 A | * | 4/1994 | Magario ...................... 700/201 |
| 5,309,369 A | * | 5/1994 | Kamiguchi et al. ......... 700/201 |
| 5,325,287 A | | 6/1994 | Spahr et al. |
| 5,870,698 A | | 2/1999 | Riedel et al. |
| 6,272,398 B1 | | 8/2001 | Osborne et al. |
| 6,311,101 B1 | * | 10/2001 | Kastner ....................... 700/197 |
| 6,668,209 B2 | * | 12/2003 | Urbanek ...................... 700/200 |
| 6,822,754 B1 | * | 11/2004 | Shiohara ..................... 358/1.15 |
| 2003/0032438 A1 | | 2/2003 | Maurilio |

FOREIGN PATENT DOCUMENTS

| | | |
|---|---|---|
| EP | 0 487 740 A1 | 6/1992 |
| JP | 4-175132 | 6/1992 |
| JP | 5-57748 | 3/1993 |

OTHER PUBLICATIONS

Chinese Office Action for Chinese Application No. 200410032646.4; dated Nov. 25, 2005.

* cited by examiner

*Primary Examiner*—Robert B. Davis
(74) *Attorney, Agent, or Firm*—Staas & Halsey LLP

(57) ABSTRACT

A molding information printing system, including a network; a molding machine connected to the network; a printer for printing the molding information of the molding machine; a print control section connected to the network independently of the molding machine, for controlling the printer for printing of the molding information; and an instructing section for instructing printing of the molding information and transferring a command to the print control section through the network. The molding machine includes a control unit connected to the network, and the instructing section is provided in the control unit. Also, the system includes a computer connected to the network independently of the molding machine, and the print control section is provided in the computer.

14 Claims, 16 Drawing Sheets

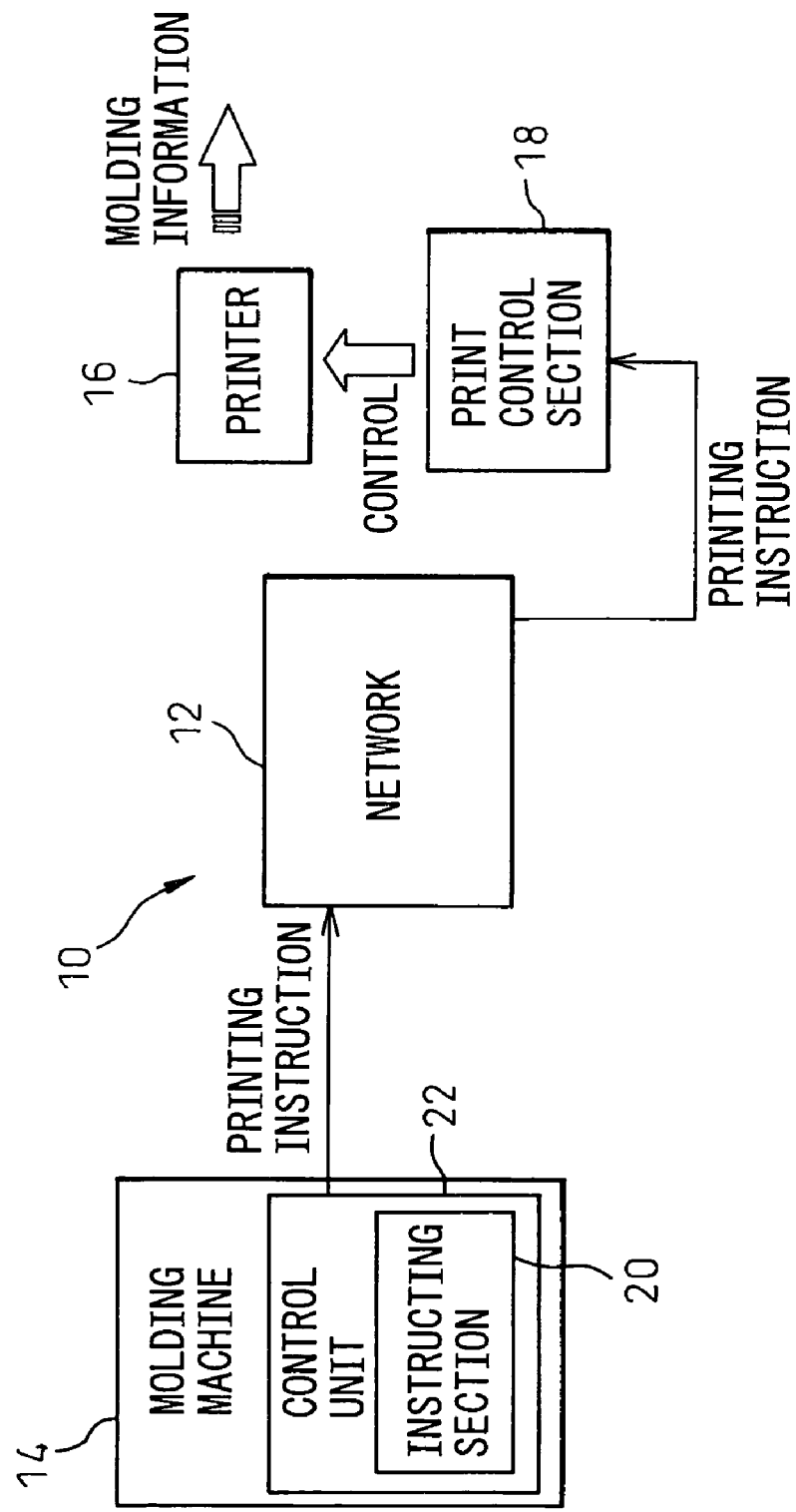

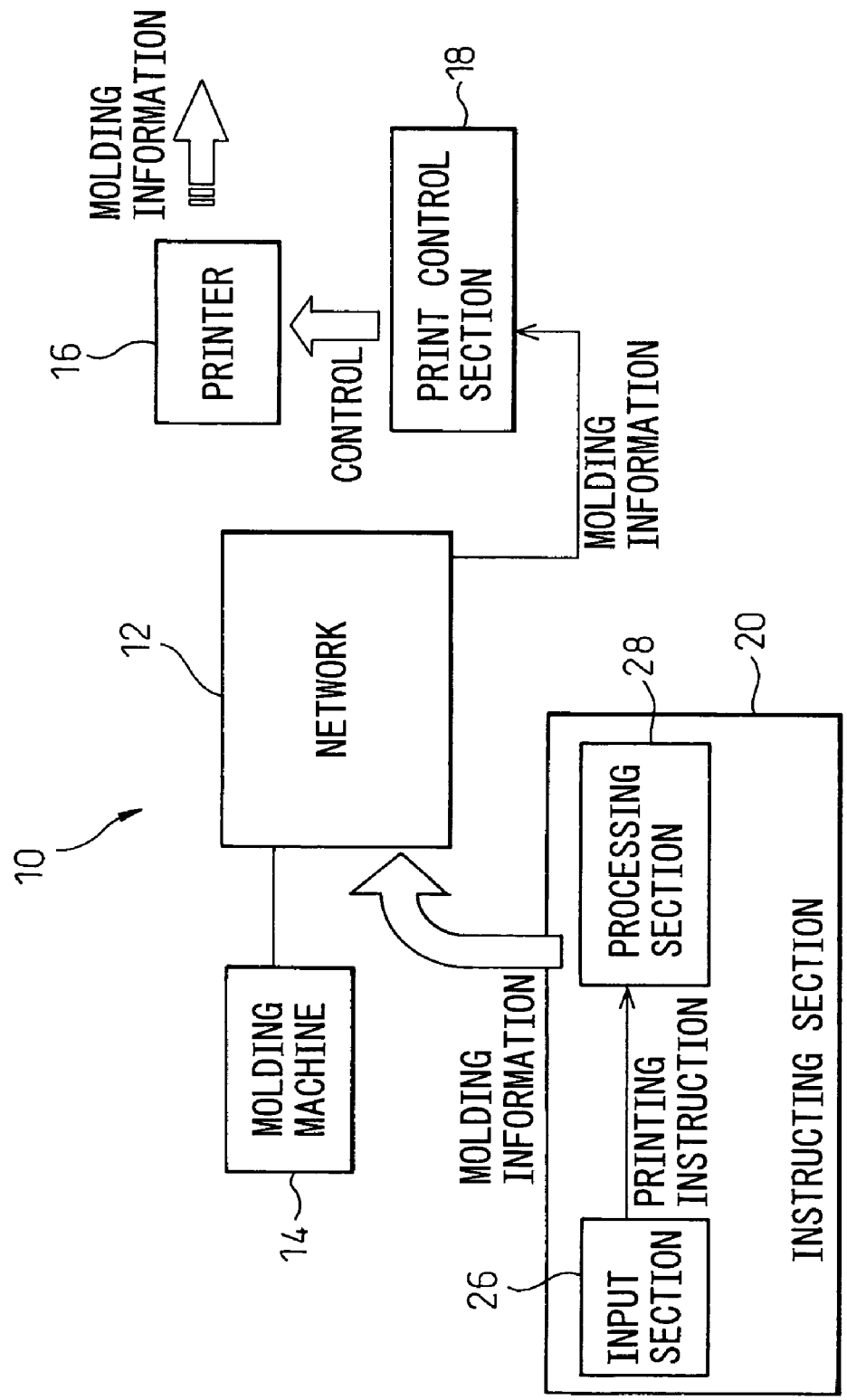

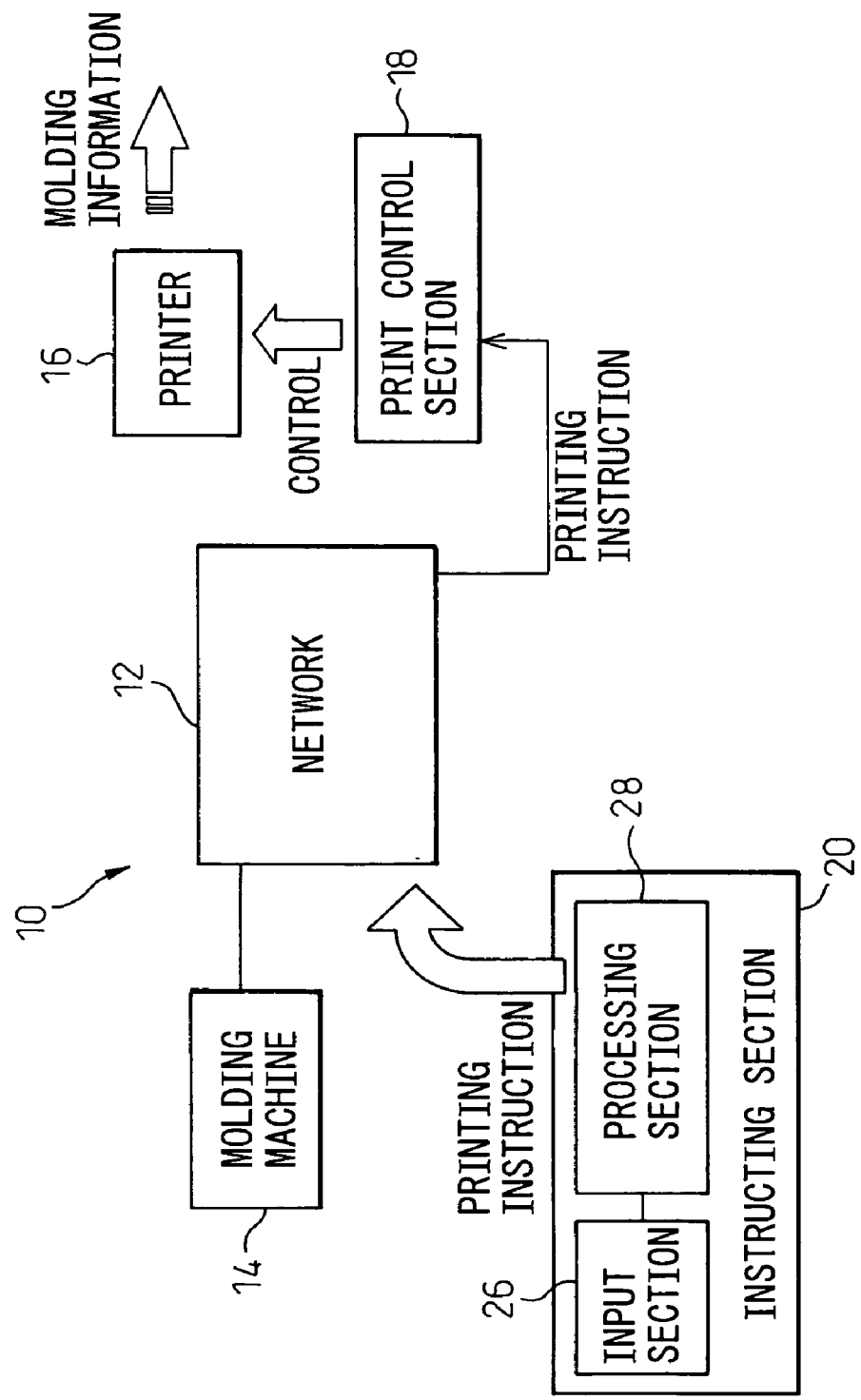

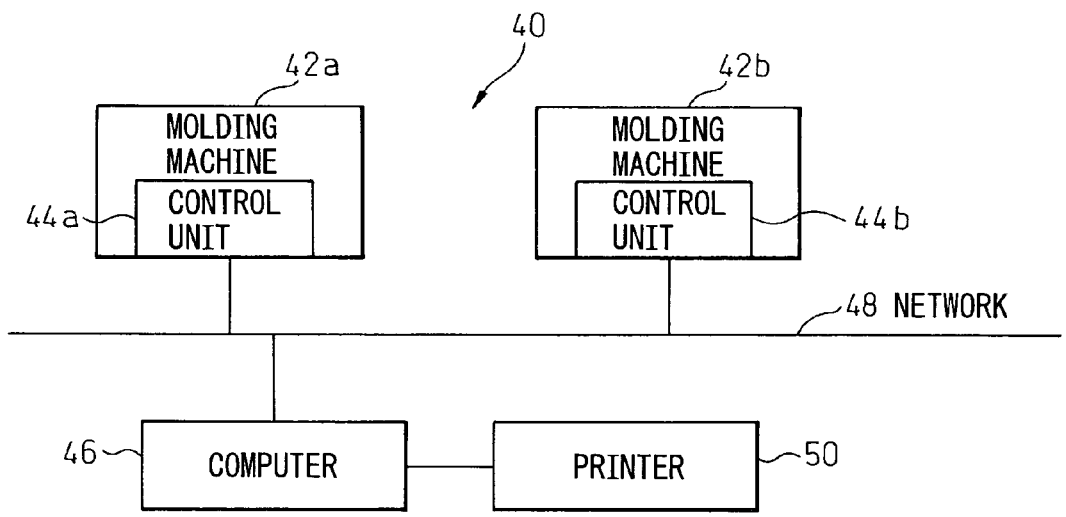
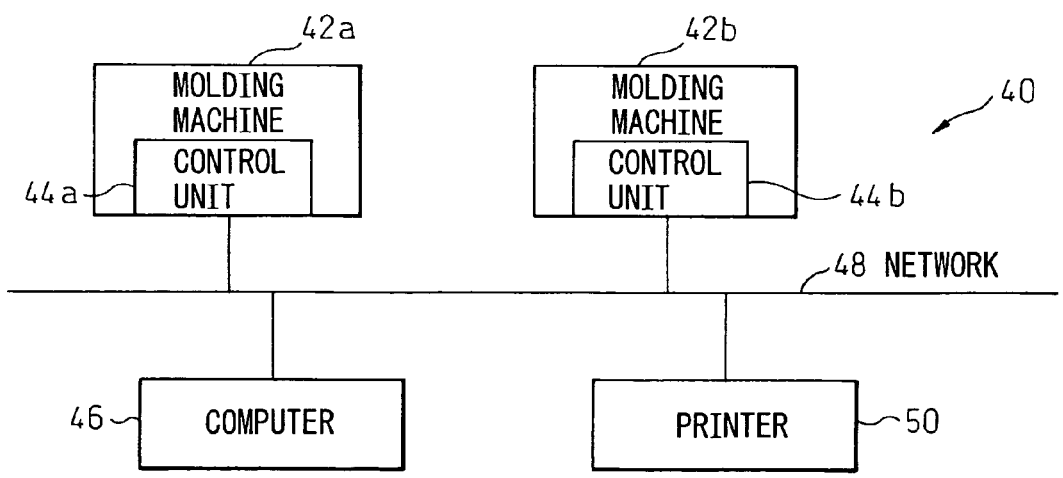

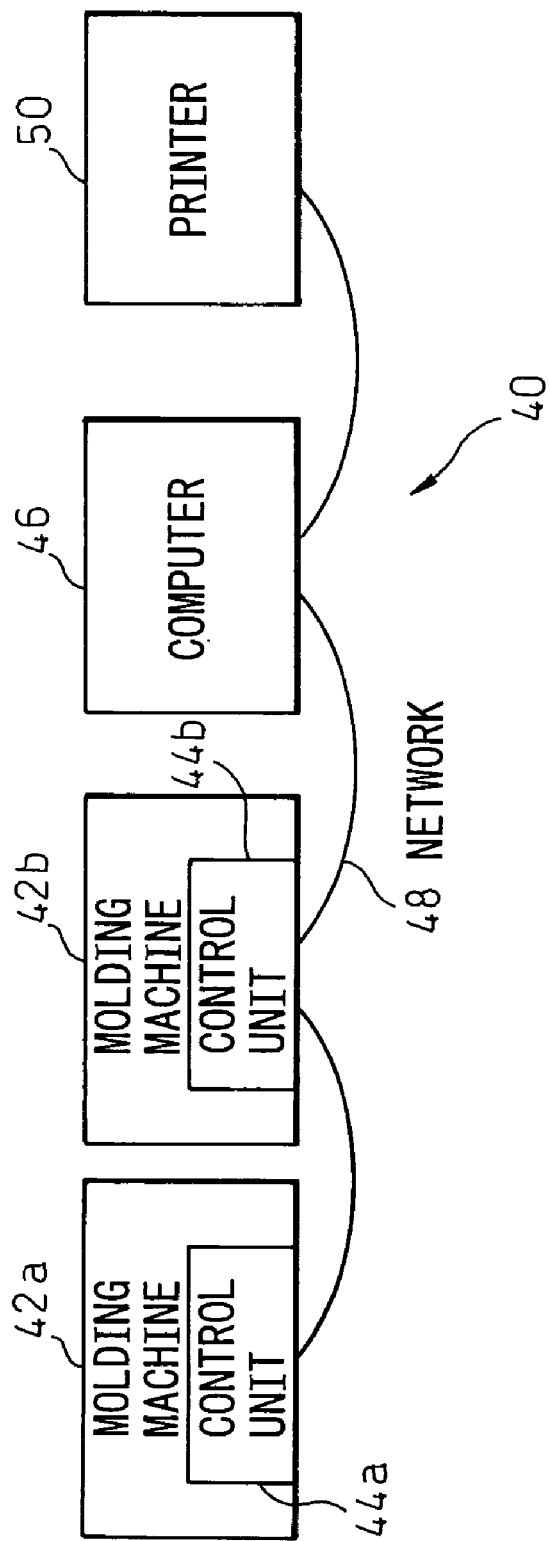

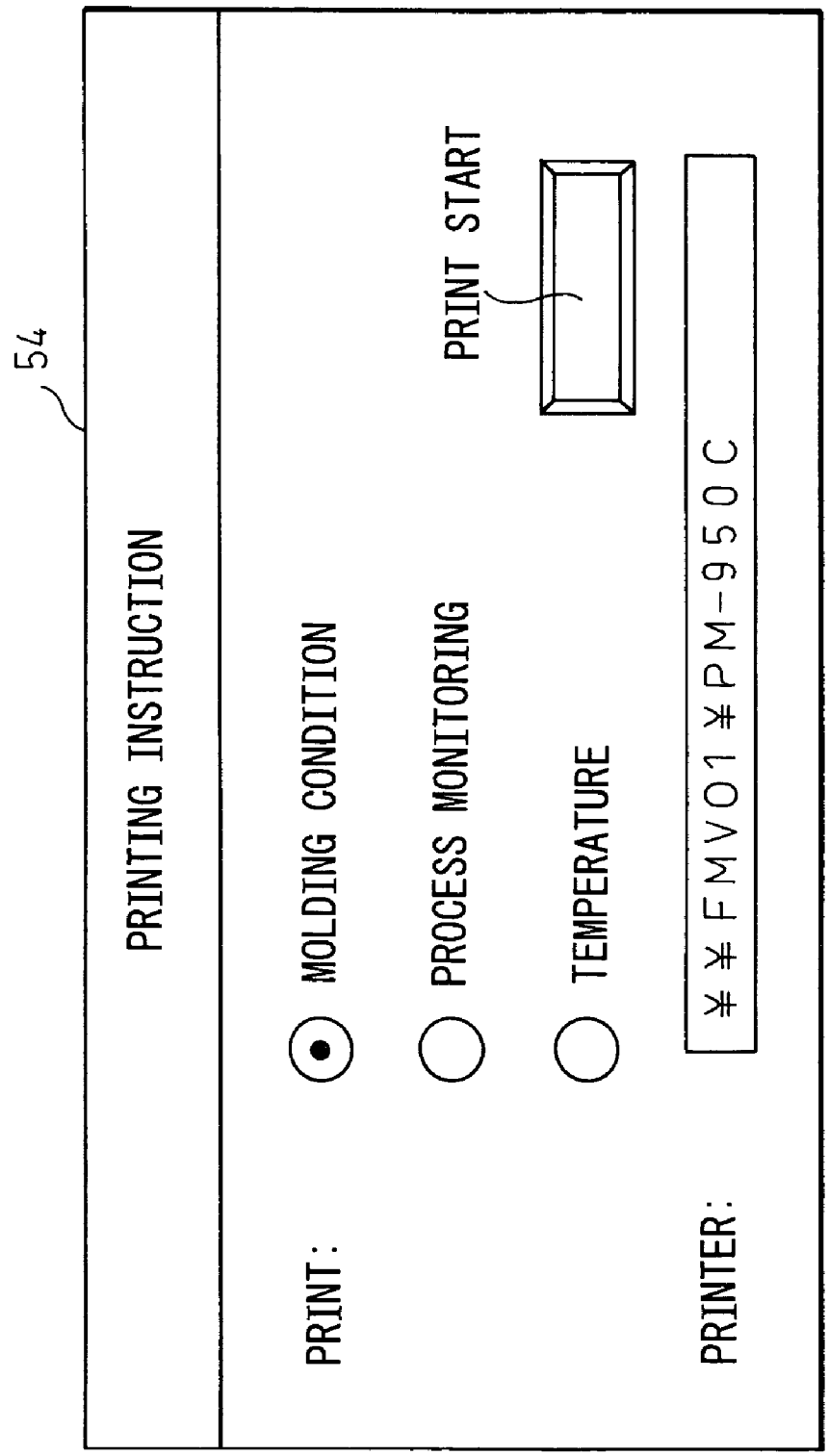

MOLDING INFORMATION PRINTING SYSTEM

BACKGROUND OF THE INVENTION

1. Field of the Invention

The present invention relates to a system for printing molding information from a molding machine.

2. Description of the Related Art

In molding machines, e.g. injection molding machines, it is a generally accepted practice to display on a display screen, under the control of a control unit provided in the molding machine, various molding information including preset values such as molding conditions, and detected values (i.e., logging data) such as temperature, injection speed and resin pressure, showing a molding situation. In this connection, in order to print the molding information (molding conditions, logging data, picture data (such as hard copies of screens), etc.) on a medium such as a paper, a suitable printer unit is connected to the molding machine and the control unit of the molding machine commands the printing unit to print, because the conventional molding machine is not provided with a printing section as a component thereof.

For example, Japanese Unexamined Patent Publication (Kokai) No. 5-57748 (JP5-57748A) discloses an injection molding machine provided with a control unit capable of transmitting print data to various types of printers, in order to permit a desired type of printer selected by a user to be connected to the injection molding machine for use. This control unit is constructed in such a manner that a user can select a printer to be actually connected, from the plural types of previously registered printers, and provide a printing command to the control unit, whereby the control unit can transmit print data to the connected printer in a print output format (or a data transmission mode) adapted to the connected printer. In this arrangement, it is necessary to previously prepare a plurality of data transmission modes adapted to the plural types of printers in the control unit of the molding machine, which causes an inconvenience in handling. Also, there is a disadvantage that only printers previously registered can be used.

Japanese Unexamined Patent Publication (Kokai) No. 4-175132 (JP4-175132A) discloses a group control system in which a plurality of injection molding machines are connected to a computer through a network, and in which a printer is connected to the computer so as to show and write all of the operating situations (or the events) of the injection molding machines together. In this system, the printer is structured in such a manner as to be able to print a single page containing an event-time writing area and event-contents writing areas corresponding respectively to the injection molding machines. If the events such as abnormal conditions occur in the respective molding machines, the printer prints the occurring times and contents of the events on the corresponding writing areas in real time by a time series expression. In this arrangement, a predetermined printer prints only the events such as abnormal conditions occurred in the respective molding machines on the single page, and thus the printer does not print, at any time, the molding information of the molding machine required by a user.

SUMMARY OF THE INVENTION

It is an object of the present invention to provide, in a system of controlling a molding machine through a network, a molding information printing system capable of printing, at any time, molding information required by a user, using any printer selected by the user.

To accomplish the above object, the present invention provides a molding information printing system, comprising a network; a molding machine connected to the network; a printer for printing molding information of the molding machine; a print control section connected to the network independently of the molding machine, for controlling the printer for printing of the molding information; and an instructing section for instructing printing of the molding information and transferring a command to the print control section through the network.

In the above molding information printing system, it is advantageous that the instructing section is provided to the molding machine.

In this arrangement, it is preferred that the molding machine includes a control unit connected to the network, and that the instructing section is provided to the control unit.

In this configuration, the control unit may output the molding information as the command, on the basis of printing instructions instructed in the instructing section.

Alternatively, the control unit may output, as the command, printing instructions instructed in the instructing section, and the print control section may acquire the molding information on the basis of the printing instructions output from the control unit.

The instructing section may also be connected to the network.

It is also advantageous that the system comprises a computer connected to the network independently of the molding machine, and that the print control section is provided in the computer.

The instructing section may comprise an input section for inputting printing instructions and a processing section for acquiring the molding information on the basis of the printing instructions input in the input section and for outputting the molding information as the command.

Alternatively, the instructing section may comprise an input section for inputting printing instructions and a processing section for outputting the printing instructions as the command, and the print control section may acquire the molding information on the basis of the printing instructions output from the processing section.

A storage section for storing the molding information may be provided to the molding machine.

Alternatively, the system may comprise a computer connected to the network independently of the molding machine, and a storage section for storing the molding information may be provided to the computer.

The printer may be connected to the print control section, and the print control section may control the printer through a line outside the network.

Alternatively, the printer may be connected to the network, and the print control section may control the printer through the network.

The system may comprise a plurality of printers controllable by the print control section, printing instructions in the instructing section may include a printer designation for designating one printer selected from the plurality of printers, and the print control section may control the one printer designated by the printer designation for printing of the molding information.

BRIEF DESCRIPTION OF THE DRAWINGS

The above and other objects, features and advantages of the present invention will become more apparent from the following description of preferred embodiments in connection with the accompanying drawings, wherein:

FIGS. 2A to 2K are block diagrams respectively showing preferred modes of a molding information printing system according to the present invention;

FIG. 3 is a block diagram showing a molding information printing system according to the first embodiment of the present invention;

FIG. 4 is a block diagram showing a molding information printing system according to the second embodiment of the present invention;

FIG. 5 is a block diagram showing a molding information printing system according to the third embodiment of the present invention;

FIG. 8 is an illustration showing a printing-instructions entering screen displayed on a display unit connected to a print control section;

DETAILED DESCRIPTION

Figure 1:
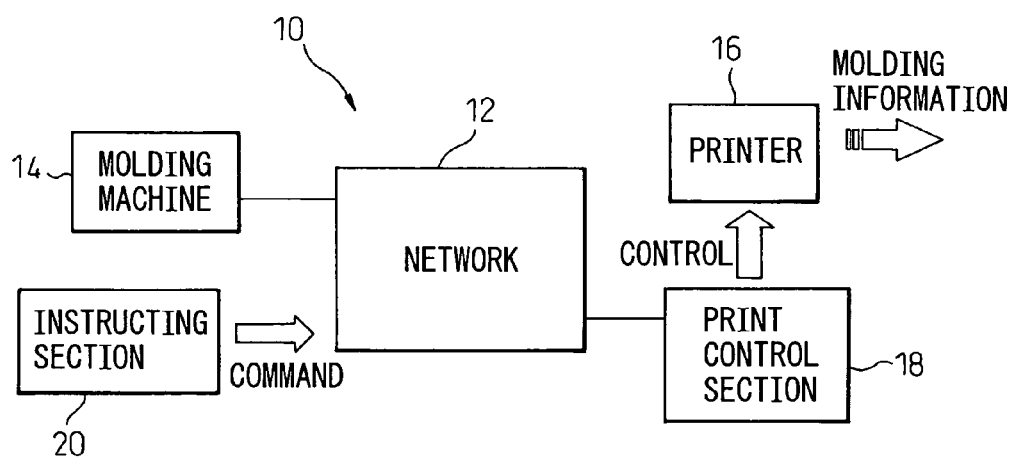
FIG. 1 is a block diagram showing a basic configuration of a molding information printing system according to the present invention.

The embodiments of the present invention are described below in detail, with reference to the accompanying drawings. In the drawings, the same or similar components are denoted by common reference numerals.

Referring to the drawings, FIG. 1 shows, in a block diagram, a basic configuration of a molding information printing system according to the present invention. The molding information printing system 10, according to the present invention, includes a network 12; a molding machine 14 connected to the network 12; a printer 16 for printing molding information of the molding machine 14; a print control section 18 connected to the network 12 independently of the molding machine 14, for controlling the printer 16 for printing of the molding information; and an instructing section 20 for instructing printing of the molding information and transferring a command to the print control section 18 through the network 12.

According to the molding information printing system 10 with the above configuration, the print control section 18 independent of the molding machine 14 (i.e., different from a control unit of the molding machine 14) makes it possible to control the desired printer 16 selected by a user. Further, the instructing section 20 makes it possible for the printer 16 to perform a printing operation, when the user directs, at an optional time, the printing of the required molding information.

Figure 2A:
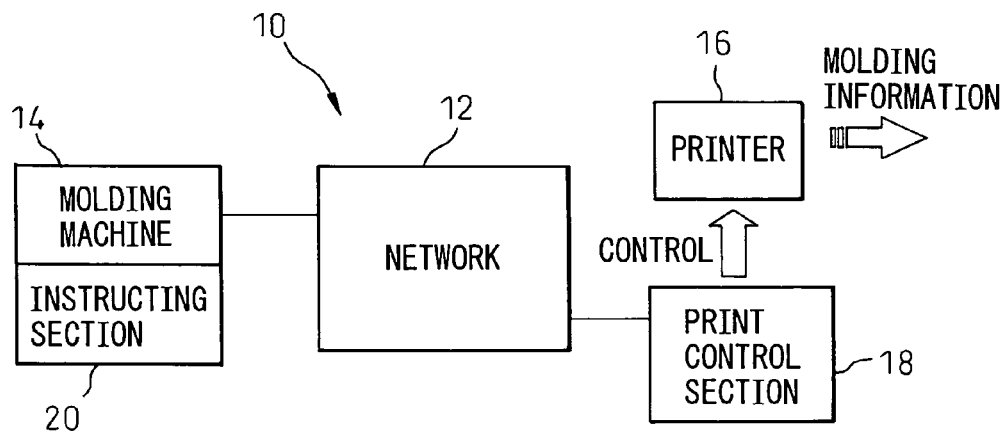
Figure 2B:
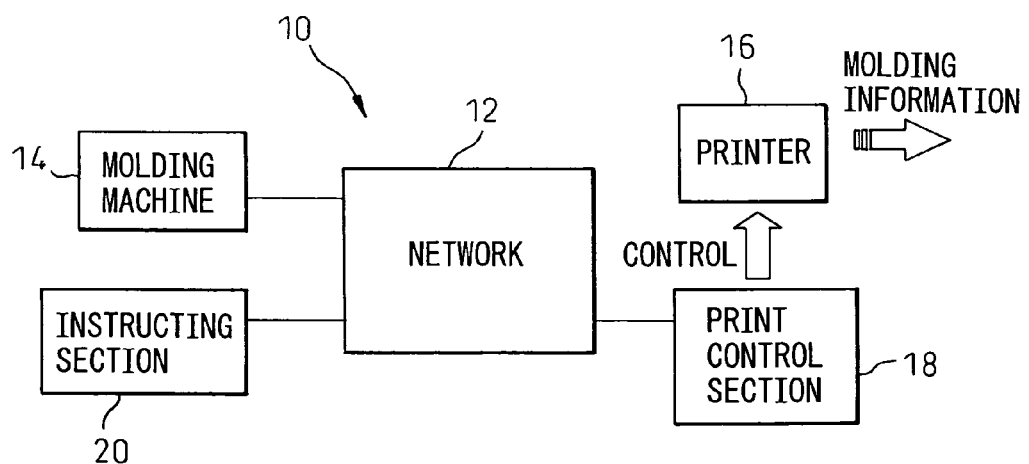
Figure 2C:
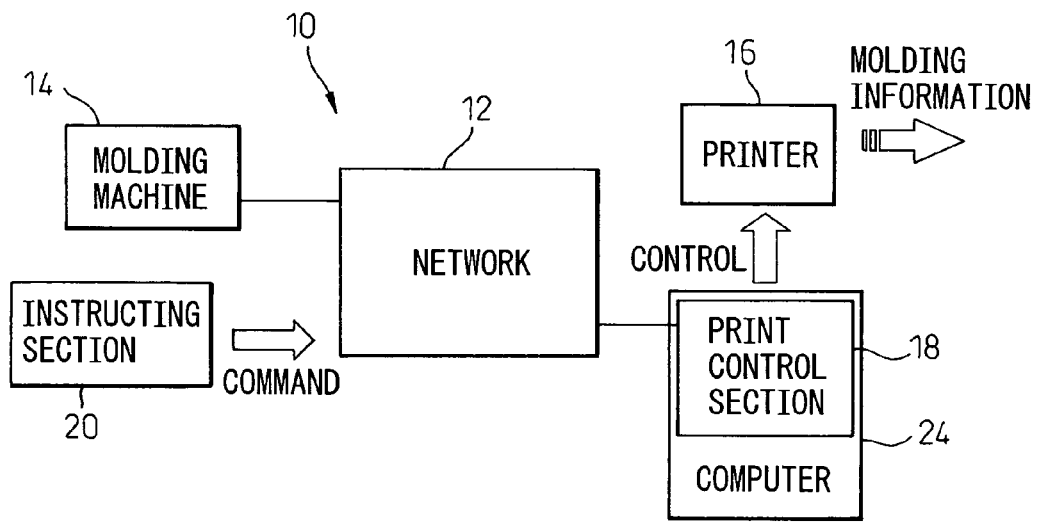

FIGS. 2A to 2K respectively show, in block diagrams, the preferred modes of the molding information printing system 10 having the above basic configuration. As shown in FIG. 2A, it is advantageous that the instructing section 20 is provided to the molding machine 14. Alternatively, as shown in FIG. 2B, the instructing section 20 may be connected to the network 12. Also, as shown in FIG. 2C, it is advantageous that the system includes a computer 24 connected to the network 12 independently of the molding machine 14, and that the print control section 18 is provided in the computer 24.

Figure 2D:
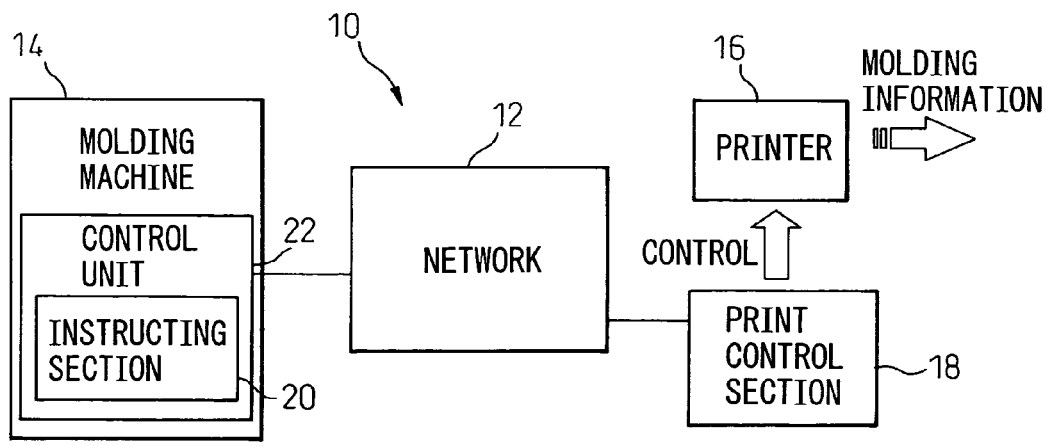
Figure 2E:
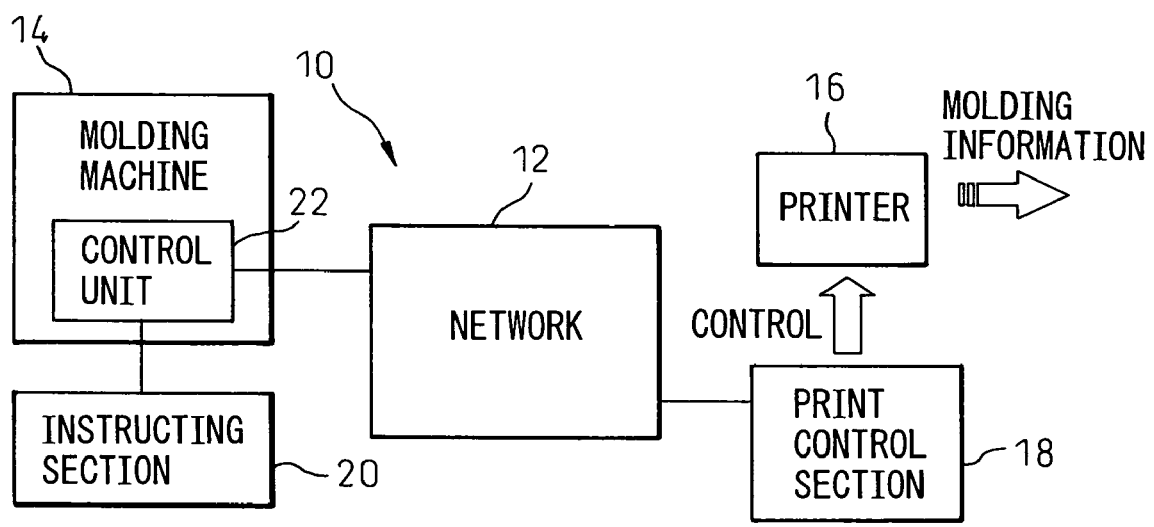

In the case where the instructing section 20 is provided to the molding machine 14, it is possible that the molding machine 14 includes a control unit 22 connected to the network 12, and that the instructing section 20 is provided to the control unit 22, as shown in FIGS. 2D and 2E. In this arrangement, the instructing section 20 may be previously incorporated in the control unit 22 (FIG. 2D), or may be externally connected to the control unit 22 (FIG. 2E).

It is the most preferred configuration that the instructing section 20 is provided to the control unit 22 of the molding machine 14 and the print control section 18 is provided in the computer 24 independent of the molding machine 14. According to this configuration, it is possible for a user to direct, at any time, the printing of the required molding information from the instructing section 20 in the molding machine 14, at the site where the molding machine 14 is situated, and to operate the print control section 18 in the computer 24 so as to control the printer 16 for the printing of this molding information. In this connection, the control unit 22 of the molding machine 14 does not control the printer 16, so that it is not necessary to prepare any driver for the printer 16 in the control unit 22. Further, the computer 24 is generally furnished with a variety of printing drivers in advance, so that it is easier to change the type of the printer 16, and thus the desired printer 16 can be used. Moreover, even when it is desired to use a new printer 16 requiring a driver not previously prepared, such a driver can be readily installed in the computer 24, so that it becomes possible to use the new printer 16.

Figure 2F:
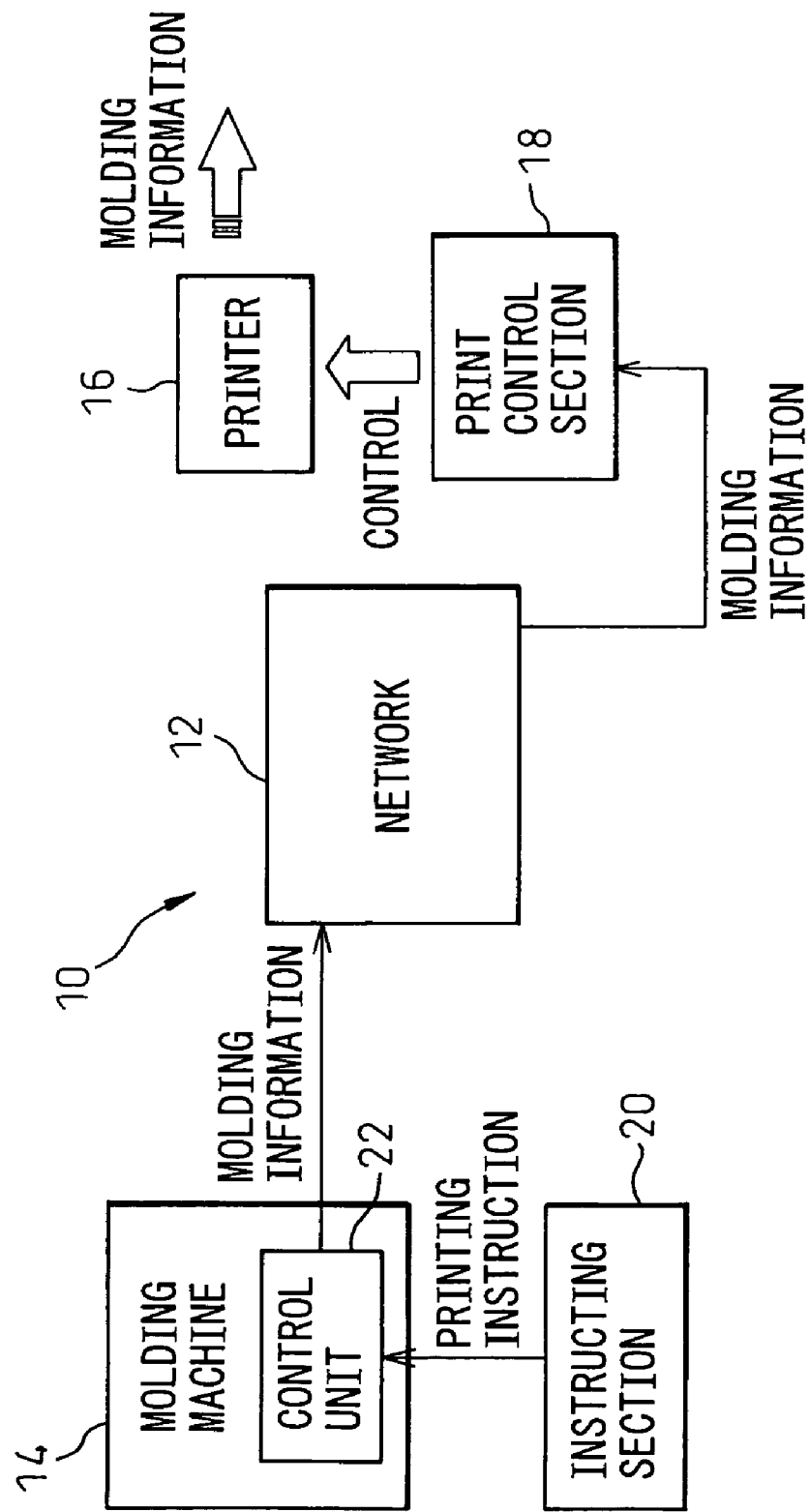

In the configuration that the instructing section 20 is provided to the control unit 22 of the molding machine 14, the control unit 22 may output the molding information as the command, on the basis of printing instructions instructed in the instructing section 20, as shown in FIG. 2F. In this arrangement, the print control section 18 receives the molding information output from the control unit 22 of the molding machine 14 through the network 12, and controls the printer 16 for the printing of this molding information. The arrangement shown in FIG. 2F can also be applied to the configuration of FIG. 2D. Alternatively, the control unit 22 may output, as the command, printing instructions instructed in the instructing section 20, as shown in FIG. 2G. In this arrangement, the print control section 18 acquires the molding information on the basis of the printing instructions output from the control unit 22, and controls the printer 16 for the printing of this molding information. The arrangement shown in FIG. 2G can also be applied to the configuration of FIG. 2E.

Further, as shown in FIG. 2H, the instructing section 20 may include an input section 26 for inputting the printing instructions and a processing section 28 for acquiring the molding information on the basis of the printing instructions input in the input section 26 and for outputting this molding information as the command. The print control section 18 receives the molding information output from the processing section 28 of the instructing section 20 through the network 12, and controls the printer 16 for the printing of this molding information.

Alternatively, as shown in FIG. 2I, the instructing section 20 may include an input section 26 for inputting the printing instructions and a processing section 28 for outputting the printing instructions input in the input section 26 as the command. The print control section 18 acquires the molding information on the basis of the printing instructions output from the processing section 28 of the instructing section 20, and controls the printer 16 for the printing of this molding information.

Figure 2J:
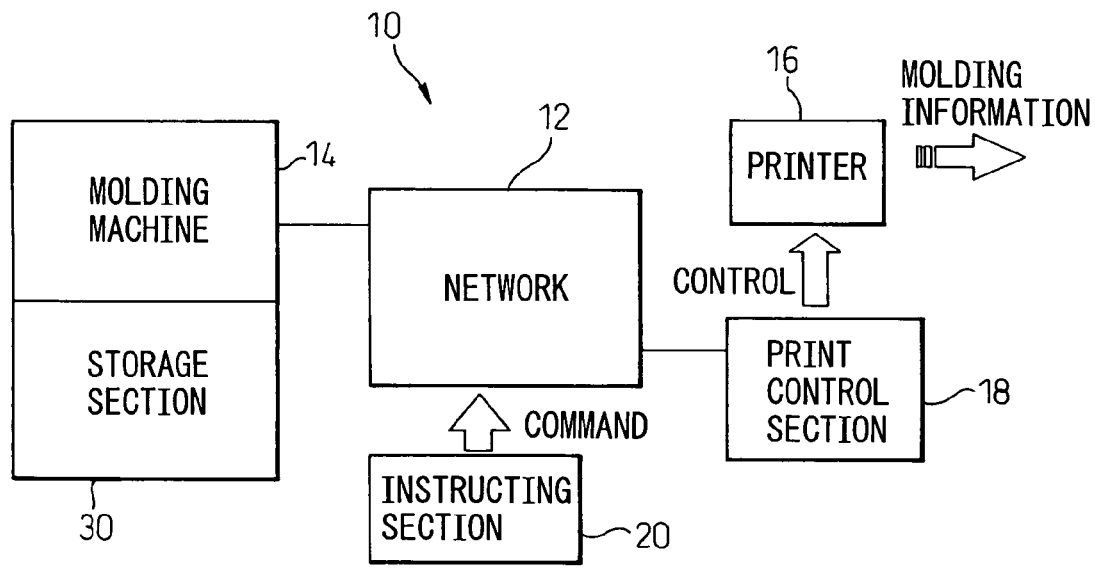

Further, as shown in FIG. 2J, a storage section 30 for storing the molding information may be provided to the molding machine 14. In this case, if the processing section 28 of the instructing section 20 is constituted to output the molding information (FIG. 2H), the processing section 28 acquires the molding information from the storage section 30 of the molding machine 14. Further, in this connection, if the instructing section 20 is constituted to be provided in the molding machine 14 (FIGS. 2A, 2D to 2F), the processing section 28 of the molding machine 14 (or the control unit 22) acquires the molding information from the storage section 30 of the same molding machine 14. On the other hand, if the processing section 28 of the instructing section 20 is constituted to output the printing instructions (FIG. 2I), the print control section 18 acquires the molding information from the storage section 30 of the molding machine 14. Further, in this connection, if the print control section 18 is constituted to be provided in the computer 24 (FIG. 2C), the print control section 18 of the computer 24 acquires the molding information from the storage section 30 of the molding machine 14. In these configurations, in the case where a plurality of molding machines 14, each of which is provided with the instructing section 20 and the storage section 30, are connected to the network 12, it is possible that the processing section 28 in one molding machine 14 acquires the molding information from the storage section 30 in the other molding machine 14, or that the print control section 18 of the computer 24 acquires the molding information from the storage section 30 in the desired molding machine 14.

Figure 2K:
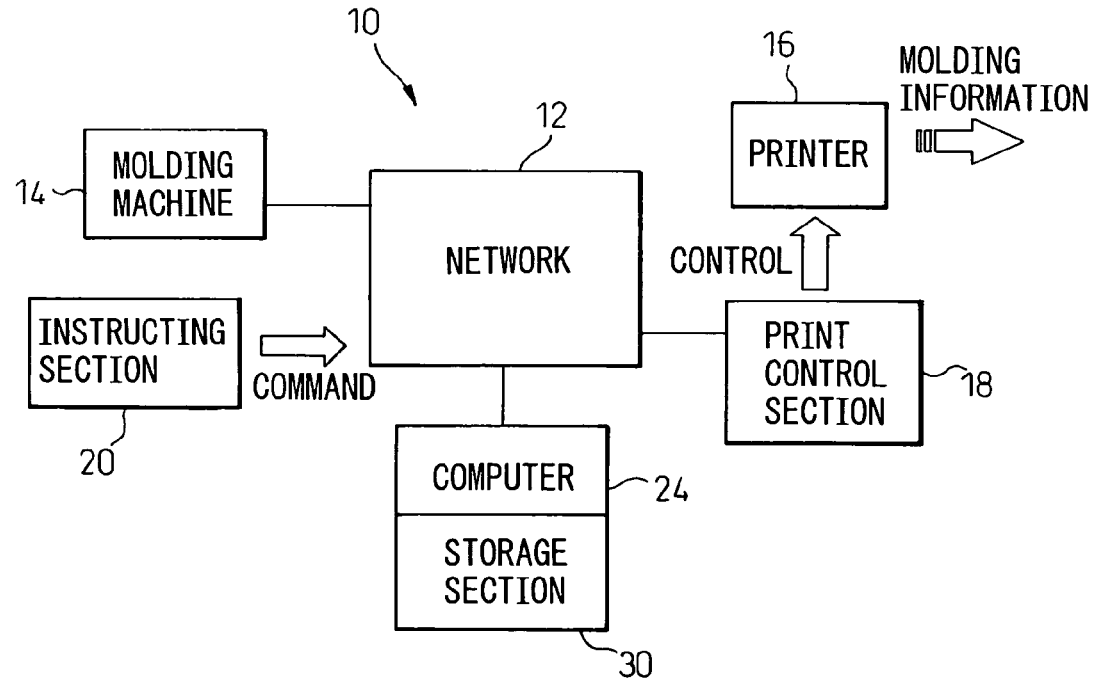

Alternatively, as shown in FIG. 2K, the system may include a computer 24 connected to the network 12 independently of the molding machine 14, and a storage section 30 for storing the molding information is provided in the computer 24. In this case, if the processing section 28 of the instructing section 20 is constituted to output the molding information (FIG. 2H), the processing section 28 acquires the molding information from the storage section 30 of the computer 24. Further, in this connection, if the instructing section 20 is constituted to be provided in the molding machine 14 (FIGS. 2A, 2D to 2F), the processing section 28 of the molding machine 14 (or the control unit 22) acquires the molding information from the storage section 30 of the computer 24. On the other hand, if the processing section 28 of the instructing section 20 is constituted to output the printing instructions (FIG. 2I), the print control section 18 acquires the molding information from the storage section 30 of the computer 24. Further, in this connection, if the print control section 18 is constituted to be provided in the computer 24 (FIG. 2C), the print control section 18 of the computer 24 acquires the molding information from the storage section 30 of the same computer 24. In these configurations, in the case where a plurality of computers 24, each of which is provided with the print control section 18 and the storage section 30, are connected to the network 12, it is possible that the processing section 28 in the molding machine 14 acquires the molding information from the storage section 30 of the desired computer 24, or that the print control section 18 of one computer 24 acquires the molding information from the storage section 30 of the other computer 24.

FIG. 3 is a block diagram showing a molding information printing system 40 according to the first embodiment of the present invention. In the first embodiment, the control units 44a, 44b, . . . (hereinafter represented by a reference numeral 44) of a plurality of molding machines (e.g., injection molding machines) 42a, 42b, . . . (hereinafter represented by a reference numeral 42) and one computer (e.g., a personal computer) 46 are connected to each other through a network 48 in the form of a bus connection. One printer 50 is connected to the computer 46. In this case, the instructing sections 18 are individually provided in the control units 44 of the respective molding machines 42 (FIG. 2D or 2E), and the print control section 18 is provided in the computer 46 (FIG. 2C). The print control section 18 of the computer 46 thus controls the printer 50 through a line outside the network 48.

In this configuration, it is possible to input the printing instructions for the molding information (molding conditions, logging data, picture data (such as hard copies of screens), etc.) of the desired molding machine 42, from each of the molding machines 42 connected through the network 48. On the basis of this printing instructions, the computer 46 can acquire the molding information of this molding machine 42 and control the printer 50 for the printing of the molding information (see FIGS. 2F to 2K).

FIG. 4 is a block diagram showing a molding information printing system 40 according to the second embodiment of the present invention. The configuration of the second embodiment is substantially identical to that of the first embodiment shown in FIG. 3, except that the printer 50 is not connected to the computer 46 but to the network 48. In other words, the control units 44 of the plural molding machines 42, one computer 46 and one printer 50 are connected to each other through the network 48 in the form of a bus connection. The print control section 18 (FIG. 2C) of the computer 46 thus controls the printer 50 through the network 48. In this configuration, the computer 46 can acquire the molding information of the desired molding machine 42 and control the printer 50 for the printing of the molding information.

FIG. 5 is a block diagram showing a molding information printing system 40 according to the third embodiment of the present invention. The configuration of the third embodiment is substantially identical to that of the first embodiment shown in FIG. 3, except that the plural molding machines 42, one computer 46 and one printer 50 are connected to each other through the network 48 in the form of a daisy-chain connection. The print control section 18 (FIG. 2C) of the computer 46 thus controls the printer 50 through the network 48. In this configuration, the computer 46 can acquire the molding information of the desired molding machine 42 and control the printer 50 for the printing of the molding information.

Figure 6:
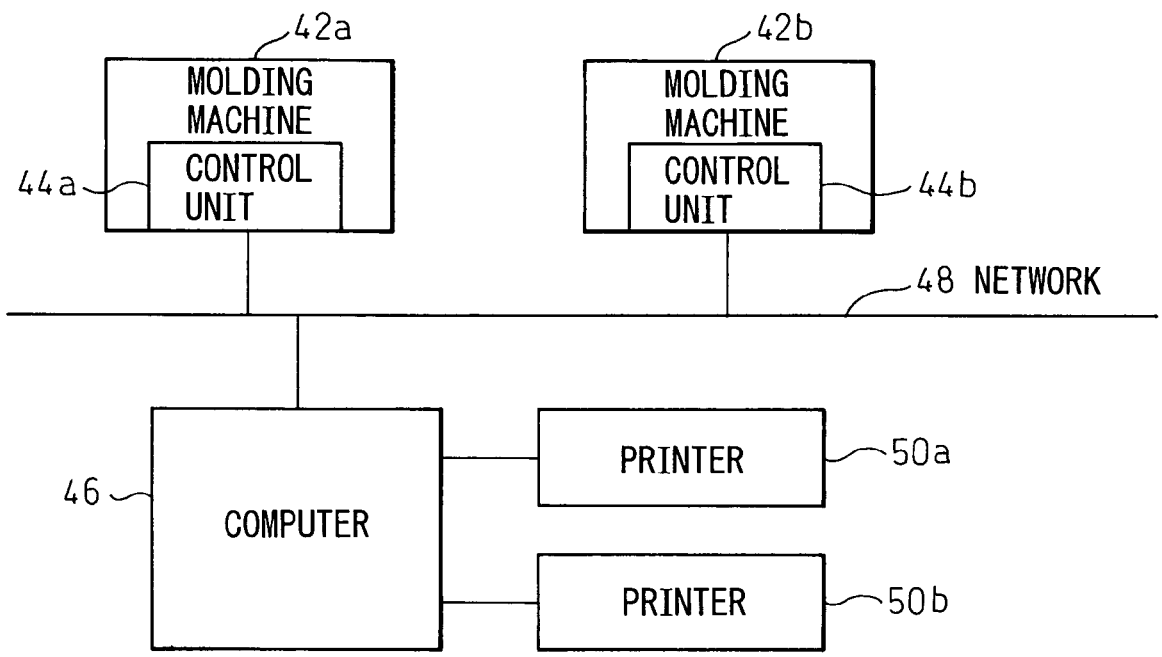
FIG. 6 is a block diagram showing a molding information printing system according to the fourth embodiment of the present invention.

FIG. 6 is a block diagram showing a molding information printing system 40 according to the fourth embodiment of the present invention. The configuration of the fourth embodiment is substantially identical to that of the first embodiment shown in FIG. 3, except that a plurality (two, in the figure) of printers 50a, 50b, . . . (hereinafter represented by a reference numeral 50) are connected to the computer 46. The print control section 18 (FIG. 2C) of the computer 46 thus controls the respective printers 50 through a line outside the network 48. In this configuration, it is possible to designate the printer 50 selected for the printing operation, on the control unit 44 of each of the molding machines 42 connected through the network 48. Also, the computer 46 can acquire the molding information of the desired molding machine 42 and control the designated printer 50 for the printing of the molding information.

Figure 7:
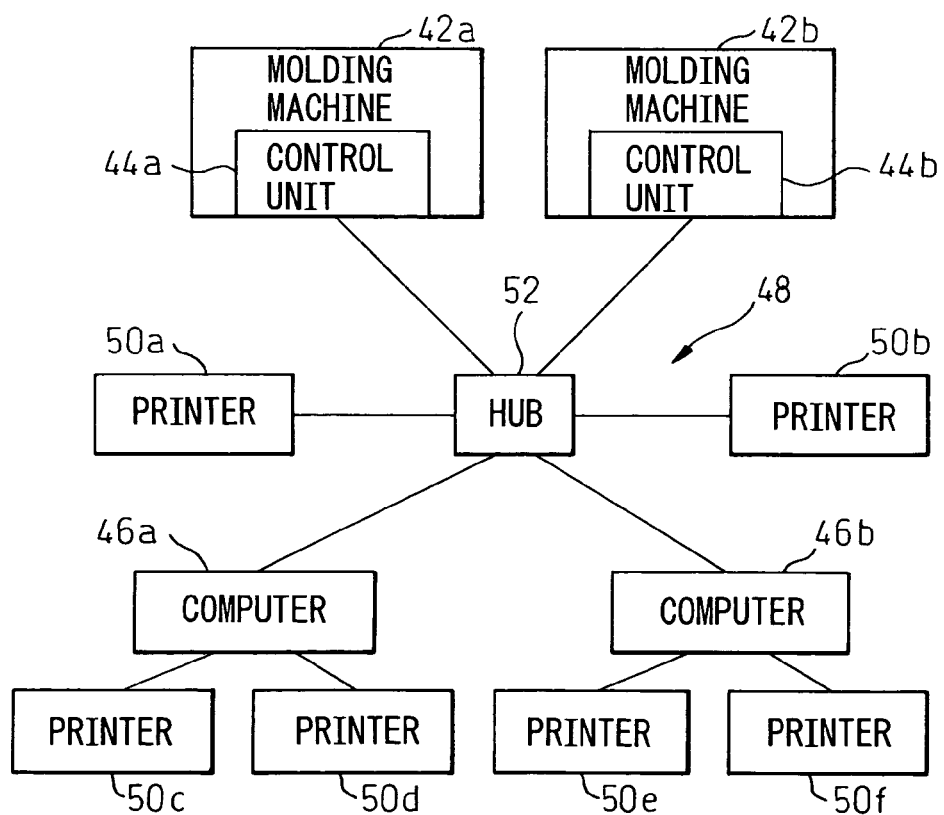
FIG. 7 is a block diagram showing a molding information printing system according to the fifth embodiment of the present invention.

FIG. 7 is a block diagram showing a molding information printing system 40 according to the fifth embodiment of the present invention. The configuration of the fifth embodiment is substantially identical to that of the first embodiment shown in FIG. 3, except that the plural molding machines 42, a plurality of computers 46a, 46b, . . . (hereinafter represented by a reference numeral 46) and the plural printers 50 are connected to each other through the network 48 in the form of a star connection. In detail, the control units 44 of the plural molding machines 42, the plural computers 46 and the plural printers 50a, 50b are connected to a hub 52 of the network 48. Further, the plural printers 50c, 50d are connected to one computer 46a, and the plural printers 50e, 50f are connected to the other computer 46b.

In this configuration, it is possible to designate the computer 46 and the printer 50, selected for the printing operation, on the control unit 44 of the respective molding machines 42. The designated computer 46 thus can acquire the molding information of the desired molding machine 42 and control the designated printer 50 for the printing of the molding information.

For example, even when the computer 46a and the printer 50e or 50f connected to the computer 46b are designated in either one of molding machines 42a, 42b, and the printing instructions are output from either one of molding machines 42a, 42b, it is possible to perform the printing operation by a printer-server technique used in a conventional computer network. In detail, the computer 46a having received the printing instructions prepares print data of the molding information by using a printer driver adapted to the printer 50c or 50d connected to the computer 46a, and transfers this print data to the other computer 46b. Then, the computer 46b drives the printer 50e or 50f so as to print the print data transferred from the computer 46a. Further, in the same way as in the second embodiment shown in FIG. 4, the designated computer 46a or 46b can drive the designated printer 50a or 50b so as to print the molding information.

Each of the above-described first to fifth embodiments may be configured in such a manner that one or more molding machines 42, one or more computers 46 and one or more printers 50 are connected to the network 48. In other words, the molding information printing system according to the present invention may be configured to include a network 48; a plurality of molding machines 42 connected to the network 48; a plurality of printers 50 capable of printing molding information of each of the molding machines 42; a plurality of print control sections 18 (preferably, computers 46) connected to the network independently of the molding machines, for controlling each printer 16 for printing of the molding information; and a plurality of instructing sections 20 (preferably, control units 44) for instructing printing of the molding information and transferring a command to each print control section 18 through the network 12. In this configuration, a desired print control section 18 selected from the plural print control sections 20 can make a desired printer 50, selected from the plural printers 50, print the molding information of a desired molding machine 42, selected from the plural molding machines 42, on the basis of the printing instructions in a desired instructing section 20 selected from the plural instructing sections 18.

In the above respective embodiments, it is possible to adopt, as the network 48, various types of networks, such as a bus connection, a star connection, a star-ring connection (i.e., a ring network including a hub), a star/bus connection (i.e., a bus connection of plural star configurations), etc. Also, the connection technique in the network may be wired or wireless. In the case of the wired connection, an Ethernet (IEEE standard for communications), RS-232C, RS-422 or RS-485 (EIA standard for serial communications) may be used.

In each of the above embodiments, the printing instructions in the instructing section 20 provided in the control unit 44 of each molding machine 42 may include an information designation for designating, as the molding information, at least one of molding condition data, preset in the molding machine 42, process monitoring data and current temperature data, both showing the operating situation of the molding machine 42. Further, in the configuration including the plural printers 50 controllable by the print control section 18 of each computer 46, the printing instructions in the instructing section 20 may include a printer designation for designating one printer 50 selected from the plural printers. In this case, the print control section 18 controls one printer designated by the printer designation for the printing of the molding information.

FIG. 8 shows, by way of example, a printing-instructions entering screen 54 displayed on a display unit (not shown) provided in the control unit 44 of each molding machine 42, in the above-described first to fifth embodiments. In this example, it is possible to direct the printing of the molding information of the molding machine 42 to be printed, in three classified representations of "MOLDING CONDITIONS", "PROCESS MONITORING" and "TEMPERATURE". A user (operator) can input the printing instructions from the input section 26 (FIGS. 2H, 2I) provided in the control unit 44 of the molding machine 42, while referring to the printing-instructions entering screen 54.

In the case where the molding machine 42 is an injection molding machine, the molding information represented by "MOLDING CONDITIONS" includes various desired values preset as molding conditions, such as an injection speed, a speed changing position (i.e., a screw position in a speed control), a retaining pressure, a retaining-pressure changing position (i.e., a screw position in a retaining-pressure control), in an injection/pressure-retaining step; a screw rotational speed, a back pressure, a back-pressure changing position (i.e., a screw position in a back-pressure control), in a metering step; a closing force in a closing step, etc. The molding information represented by "MOLDING CONDITIONS" is stored in the storage section 30 (FIG. 2J) provided to the molding machine 42 (or in the control unit 44).

Also, the molding information represented by "PROCESS MONITORING" includes various current values detected during respective injection molding processes, i.e., various logging data showing a current molding situation, such as a resin pressure, a screw speed, a temperature, a molding cycle time, etc. The molding information represented by "PROCESS MONITORING" is detected by each molding machine 42 itself, and is stored in the storage section 30 (FIG. 2J) provided thereto (or in the control unit 44) at every time of detection.

Also, the molding information represented by "TEMPERATURE" includes various current temperatures detected at a certain time period (i.e., at a detection timing different from the temperature data of "PROCESS MONITORING"), such as a metal-mold temperature, a heater-zone temperature in a barrel, etc. The molding information represented by "TEMPERATURE" is also detected by each molding machine 42 itself, and is stored in the storage section 30 (FIG. 2J) provided thereto (or in the control unit 44) at every time of detection.

In the printing-instructions entering screen 54 shown in FIG. 8, it is possible to further designate the printer 50 selected for printing the molding information. At this time, it is also possible to simultaneously designate the computer 46 for controlling the selected printer 50. The selective designation for the computer 46 and the printer 50 will be described below.

First, at the time when a network system as described in the above embodiments is established or when the molding machine 42, the computer 46 or the printer 50, which is the constituent element of the network, is added or changed, the computer(s) 46 and the printer(s) 50 are registered into the control unit 44 of each molding machine 42 or each computer 46. In this connection, in the configuration wherein one computer 46 and one printer 50 are connected to the network 48 as in the above-described first to third embodiments, the registration of the computer 46 and the printer 50 for printing purpose is normally unnecessary. On the other hand, in the configuration of the above-described fourth embodiment wherein the plural printers 50 are connected to one computer 46, the computer 46 and the printers 50 are to be previously registered. Also, in the configuration of the above-described fifth embodiment wherein the plural computers 46 and the plural printers 50 are used, the computers 46 and the printers 50 are to be previously registered.

In general, a computer 46 and a printer 50 for use in a printing process are selected by a user as a combination of a printer 50 used for the printing and a computer 46 capable of driving this printer 50. Therefore, in the case where the computer 46 and the printer 50 are selectively designated in the molding machine 42, it may be applicable to designate individually the computer 46 and the printer 50, but it is advantageous that the possible combinations of computers 46 and printers 50 are previously registered in the form of a list into the control unit 44 and that a desired combination is selected and designated from the list. For example, in the above-described fifth embodiment, the twelve types of combinations of the computer 46 and the printer 50 for use in a printing process can be registered, as follows:

1) Computer 46a-Printer 50a
2) Computer 46a-Printer 50b
3) Computer 46a-Printer 50c
4) Computer 46a-Printer 50d
5) Computer 46a-Printer 50e
6) Computer 46a-Printer 50f
7) Computer 46b-Printer 50a
8) Computer 46b-Printer 50b
9) Computer 46b-Printer 50c
10) Computer 46b-Printer 50d
11) Computer 46b-Printer 50e
12) Computer 46b-Printer 50f

These combinations of the computers 46 and the printers 50, each capable of performing the printing process, are previously registered, in the form of a list distinguishably showing them by the names or the placing sites thereof, into the control unit 44 of respective molding machines 42 or the respective computers 46. Then, the combinations 1 to 12 are displayed on the printing-instructions entering screen 54, so as to permit the designation of the desired combination selected among them. In the example of FIG. 8, the desired combination of the computer 46 and the printer 50, represented by some letters, is selected and designated.

Thus, on the printing-instructions entering screen 54, the molding information of the molding machine 42 required by a user is instructed using the classifications "MOLDING CONDITIONS", "PROCESS MONITORING", "TEMPERATURE", while the computer 46 and the printer 50 for use in the printing process are selected and instructed, and thereafter a print start command is input, whereby the designated printer 50 operates to print the designated molding information. Incidentally, the printing-instructions entering screen 54 may further include a space for the selection and designation of the molding machine 42. In this case, the printing instructions designating the molding machine having the required molding information, the type of molding information, as well as the computer and printer for printing process, can be input in any molding machine 42.

Various exemplary modes of a molding information printing process in the molding information printing system according to the present invention are explained below with reference to FIGS. 9A to 11B.

Figure 9A:
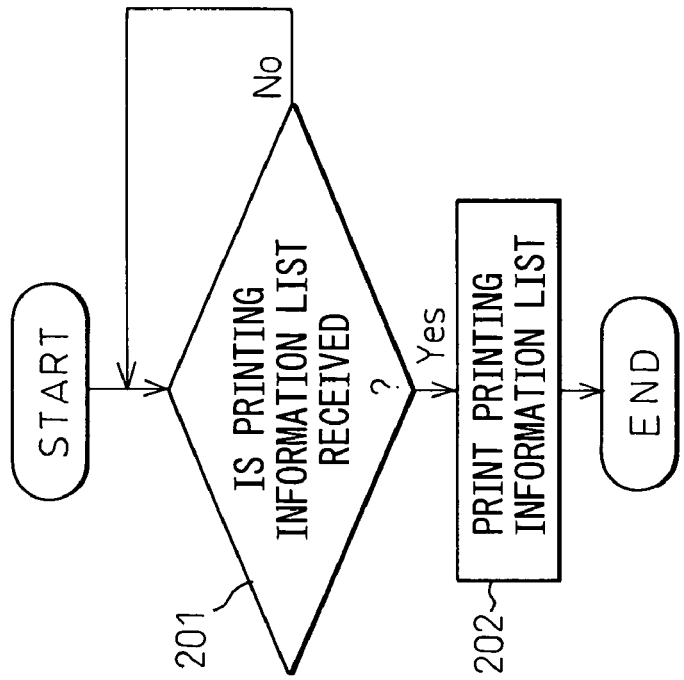
FIGS. 9A and 9B are flowcharts showing the first mode of a molding information printing process in the molding information printing system of the present invention.
Figure 9B:
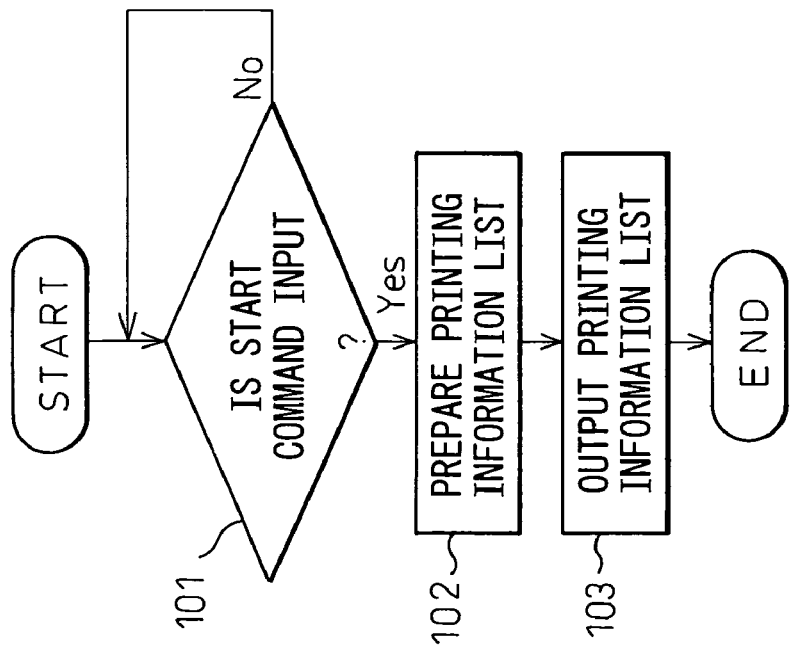

FIGS. 9A and 9B show the first mode of the molding information printing process, performed by the control unit 44 of the molding machine 42 and the computer 46 in the above-described first to fifth embodiments. The system configuration executing this first processing mode corresponds to the combination of the above-described modes shown in FIGS. 2A, 2C, 2D or 2E, 2F, 2H and 2J. FIG. 9A shows a process flow executed by the processing section 28 (FIG. 2H) of the control unit 44 of one molding machine 42, and FIG. 9B shows a process flow executed by the print control section 18 (FIG. 2C) of one computer 46.

First, in step 101, the processing section 28 judges whether the print start command is input in the input section 26 (FIG. 2H) of the control unit 44. If the print start command is input, the processing section 28 reads out the molding information (MOLDING CONDITIONS, PROCESS MONITORING, TEMPERATURE) instructed in the input section 26 from the storage section 30 (FIG. 2J) of the control unit 44, in step 102, and prepares an information list for printing, in a predetermined form such as a table. Next, in step 103, the processing section 28 transmits the information list for printing to the computer 46 indicated in the input section 26, and then completes the print process.

On the other hand, the computer 46, which is monitoring the transmission of the information list for printing from the control unit 44 of the molding machine 42, judges whether the transmitted information list for printing is addressed to the present computer 46, in step 201, and receives the list if it is addressed thereto. Next, in step 202, the computer 46 controls and drives the printer 50 indicated in the input section 26, so that the printer 50 prints the information list for printing. In this connection, in the configurations of the first and fourth embodiments as well as of one part of the fifth embodiment wherein the printer(s) 50 is connected to the computer 46, the computer 46 directly drives the connected printer 50 so as to print the molding information. On the other hand, in the configurations of the second and third embodiments as well as of the other part of the fifth embodiment, the computer 46 drives the printer 50 through the network 48 so as to print the molding information.

Figure 10B:
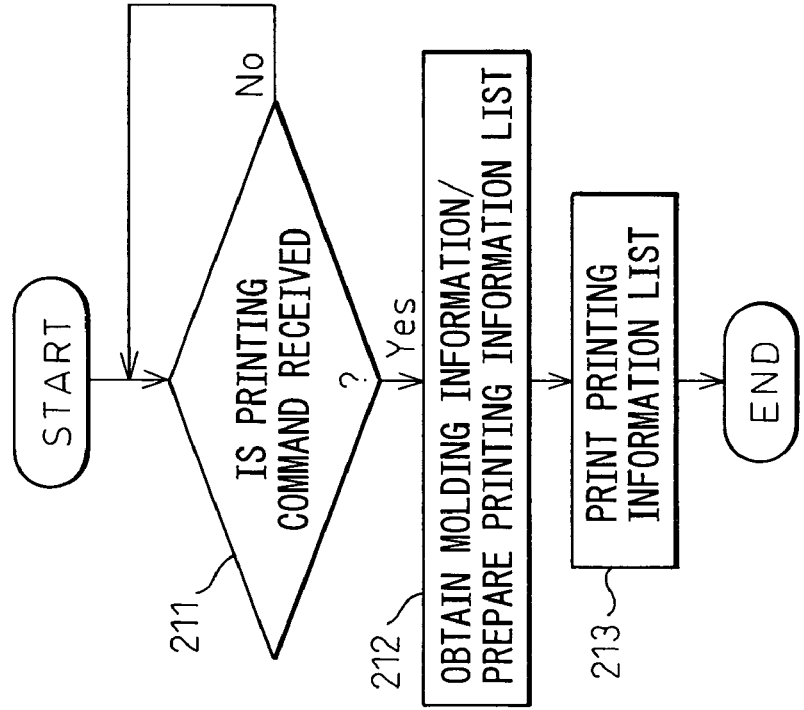
FIGS. 10A and 10B are flowcharts showing the second mode of a molding information printing process in the molding information printing system of the present invention.
Figure 10A:
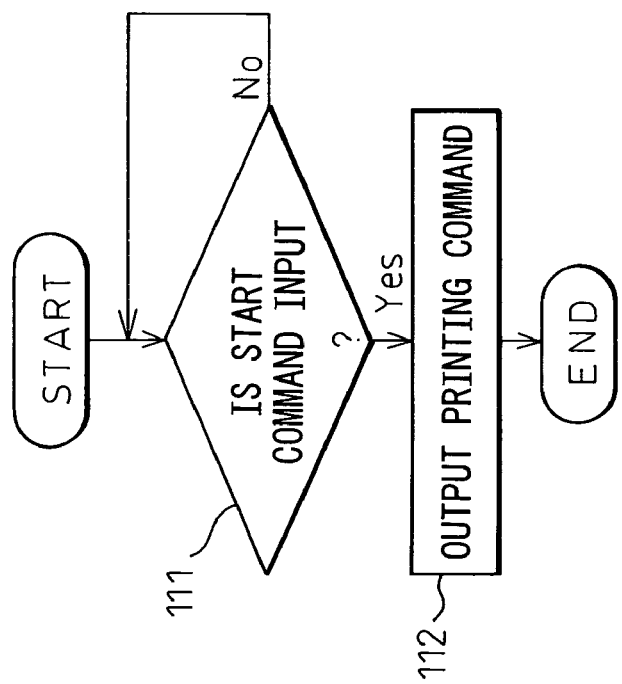

FIGS. 10A and 10B show the second mode of the molding information printing process, performed by the control unit 44 of the molding machine 42 and the computer 46 in the above-described first to fifth embodiments. The system configuration executing this second processing mode corresponds to the combination of the above-described modes shown in FIGS. 2A, 2C, 2D or 2E, 2G, 2I and 2J. FIG. 10A shows a process flow executed by the processing section 28 (FIG. 2I) of the control unit 44 of one molding machine 42, and FIG. 10B shows a process flow executed by the print control section 18 (FIG. 2C) of one computer 46.

First, in step 111, the processing section 28 judges whether the print start command is input in the input section 26 (FIG. 2I) of the control unit 44. If the print start command is input, the processing section 28 transmits, in step 112, the printing instructions including no molding information to the computer 46 indicated in the input section 26, and then completes the print process.

On the other hand, the computer 46, which is monitoring the transmission of the printing instructions from the control unit 44 of the molding machine 42, judges whether the transmitted printing instructions are addressed to the present computer 46, in step 211, and receives the instructions if they are addressed thereto. Next, in step 212, the computer 46 accesses the control unit 44 of the molding machine 42 outputting the printing instructions, reads out the molding information (MOLDING CONDITIONS, PROCESS MONITORING, TEMPERATURE) instructed in the input section 26 from the storage section 30 (FIG. 2J) of the control unit 44, and prepares an information list for printing, in a predetermined form such as a table. Next, in step 213, the computer 46 controls and drives the printer 50 indicated in the input section 26, through the network 48 or a line outside the network 48, so that the printer 50 prints the information list for printing.

Figure 11B:
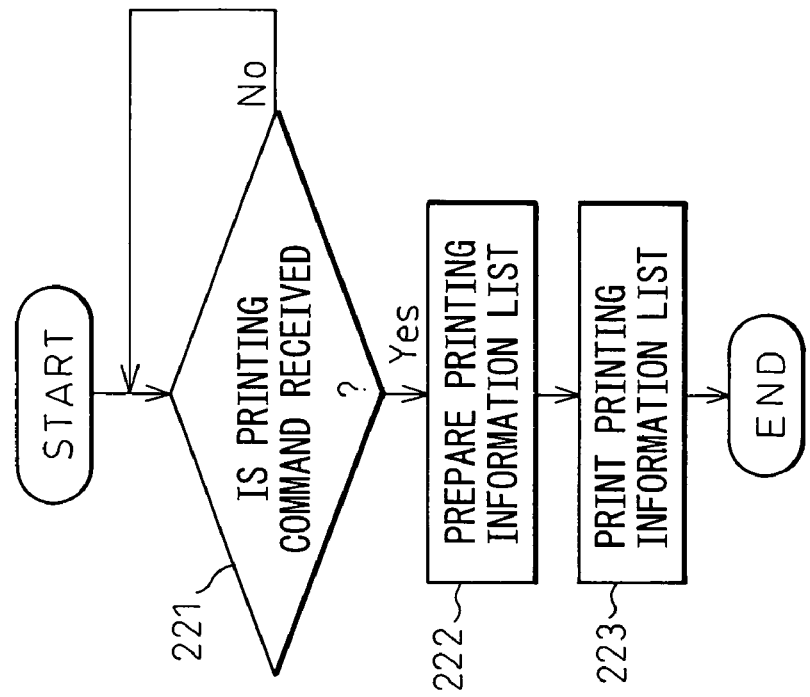
FIGS. 11A and 11B are flowcharts showing the third mode of a molding information printing process in the molding information printing system of the present invention.
Figure 11A:
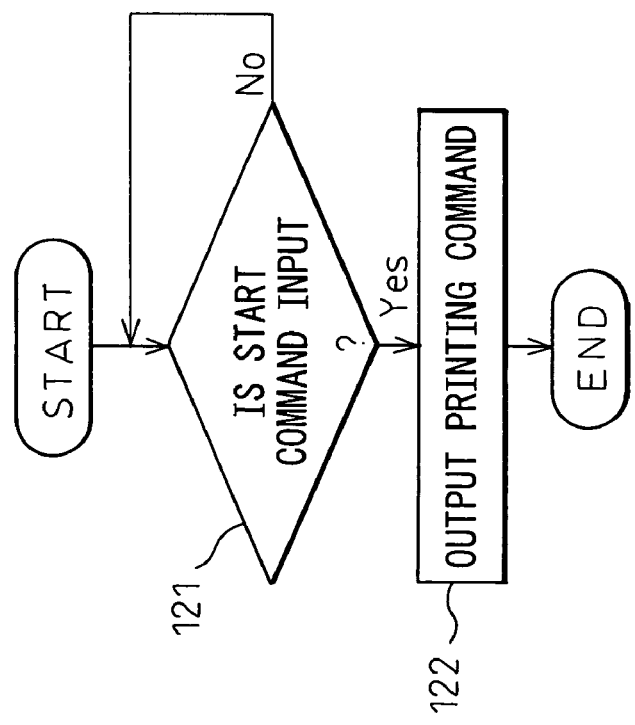

FIGS. 11A and 11B show the third mode of the molding information printing process, performed by the control unit 44 of the molding machine 42 and the computer 46 in the above-described first to fifth embodiments. The system configuration executing this third processing mode corresponds to the combination of the above-described modes shown in FIGS. 2A, 2C, 2D or 2E, 2G, 2I and 2K. FIG. 11A shows a process flow executed by the processing section 28 (FIG. 2I) of the control unit 44 of one molding machine 42, and FIG. 11B shows a process flow executed by the print control section 18 (FIG. 2C) of one computer 46.

In the third processing mode, each computer 46 collects the molding information from each molding machine 42 and stores it in the storage section 30 (FIG. 2K). For example, the preset values such as molding conditions are transferred from the molding machine 42 to the computer 46 every time when the presetting is changed, and the computer 46 stores and updates the preset values in the storage section 30 thereof as to be distinguished for the respective molding machines 42. Further, each computer 46 reads out the logging data such as the process monitoring data and the temperature data from each molding machine 42 at predetermined periods such as every time of molding cycles or certain time intervals, and stores them in the storage section 30 as to be distinguished for the respective molding machines 42.

First, in step 121, the processing section 28 judges whether the print start command is input in the input section 26 (FIG. 2I) of the control unit 44. If the print start command is input, the processing section 28 transmits, in step 122, the printing instructions including no molding information to the computer 46 indicated in the input section 26, and then completes the print process.

On the other hand, the computer 46, which is monitoring the transmission of the printing instructions from the control unit 44 of the molding machine 42, judges whether the transmitted printing instructions are addressed to the present computer 46, in step 221, and receives the instructions if they are addressed thereto. Next, in step 222, the computer 46 reads out the molding information (MOLDING CONDITIONS, PROCESS MONITORING, TEMPERATURE) instructed in the input section 26 from its own storage section 30, in association with the molding machine 42 outputting the printing instructions, and prepares an information list for printing, in a predetermined form such as a table. Next, in step 223, the computer 46 controls and drives the printer 50 indicated in the input section 26, through the network 48 or a line outside the network 48, so that the printer 50 prints the information list for printing.

Incidentally, when the molding information represented by "MOLDING CONDITIONS" is printed, it is preferred that the printer 50 is driven to print, just after the printing instructions thereof are input in the input section 26. Contrary to this, as for the logging data instructed by "PROCESS MONITORING" or "TEMPERATURE", it is preferred that the data is printed after the information list for printing, collectively showing data corresponding to a unit print (e.g., one page), is prepared. In this connection, if the printing instructions for the similar logging data are input from the other molding machine 42 during the time when the information list for printing is prepared, it is advantageous that the information list for printing, wherein the desired molding information of these molding machines 42 are written in a parallel arrangement, is prepared and printed, from the viewpoint of saving of paper.

Although, in the above-described first to fifth embodiments, the printing instructions for the molding information are input from the input section 26 of each molding machine 42, it is also possible to input the printing instructions from each computer 46. In this case, a printing-instructions entering screen displayed on a display of the computer 46 may be constituted so as to add a space for the selection and designation of the molding machine 42 to the printing-instructions entering screen 54 shown in FIG. 8. As a result, it is possible for any computer 46 to input the printing instructions designating the molding machine having the required molding information, the type of molding information, as well as the computer and printer. In this configuration, the designated computer 46 executes processing steps after step 211 in FIG. 10B or processing steps after step 221 in FIG. 11B, and thereby the designated printer 50 can print the designated molding information.

As will be understood from the above, according to the present invention, it is possible to suitably select the computer and the printer for printing the molding information. Therefore, it is possible to satisfy various requirements, such that, in an arrangement wherein plural computers and plural printers, connected to a network, are situated respectively in a site where a molding machine is situated and in another place such as a system management room, and the printer in the management room is usually used to print the molding information, while the printer in the molding machine site is also used to print the molding information if the molding information is needed on the molding machine site.

While the invention has been described with reference to specific preferred embodiments, it will be understood, by those skilled in the art, that various changes and modifications may be made thereto without departing from the spirit and scope of the following claims.

The invention claimed is:

1. A molding information printing system, comprising:
    a network;
    a molding machine connected to said network;
    a printer for printing molding information of said molding machine;
    a print control section connected to said network independently of said molding machine, for controlling said printer for printing of said molding information; and
    an instructing section for instructing printing of said molding information and transferring a command to said print control section through said network.

2. A molding information printing system as set forth in claim 1, wherein said instructing section is provided to said molding machine.

3. A molding information printing system as set forth in claim 2, wherein said molding machine includes a control unit connected to said network, and wherein said instructing section is provided to said control unit.

4. A molding information printing system as set forth in claim 3, wherein said control unit outputs said molding information as said command, based on printing instructions instructed in said instructing section.

5. A molding information printing system as set forth in claim 3, wherein said control unit outputs, as said command, printing instructions instructed in said instructing section, and wherein said print control section acquires said molding information based on said printing instructions output from said control unit.

6. A molding information printing system as set forth in claim 1, wherein said instructing section is connected to said network.

7. A molding information printing system as set forth in claim 1, comprising a computer connected to said network independently of said molding machine, wherein said print control section is provided in said computer.

8. A molding information printing system as set forth in claim 1, wherein said instructing section comprises an input section for inputting printing instructions and a processing section for acquiring said molding information based on said printing instructions input in said input section and for outputting said molding information as said command.

9. A molding information printing system as set forth in claim 1, wherein said instructing section comprises an input section for inputting printing instructions and a processing section for outputting said printing instructions as said command, and wherein said print control section acquires said molding information based on said printing instructions output from said processing section.

10. A molding information printing system as set forth in claim 1, wherein a storage section for storing said molding information is provided to said molding machine.

11. A molding information printing system as set forth in claim 1, comprising a computer connected to said network independently of said molding machine, wherein a storage section for storing said molding information is provided to said computer.

12. A molding information printing system as set forth in claim 1, wherein said printer is connected to said print control section, and wherein said print control section controls said printer through a line outside said network.

13. A molding information printing system as set forth in claim 1, wherein said printer is connected to said network, and wherein said print control section controls said printer through said network.

14. A molding information printing system as set forth in claim 1, comprising a plurality of printers controllable by said print control section, wherein printing instructions in said instructing section include a printer designation for designating one printer selected from said plurality of printers, and wherein said print control section controls said one printer designated by said printer designation for printing of said molding information.

* * * * *